US010693567B2

(12) United States Patent
Tillotson

(10) Patent No.: US 10,693,567 B2
(45) Date of Patent: Jun. 23, 2020

(54) VEHICLE COMMUNICATION SYSTEM AND METHOD

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 350 days.

(21) Appl. No.: 15/636,907

(22) Filed: Jun. 29, 2017

(65) Prior Publication Data

US 2019/0007144 A1 Jan. 3, 2019

(51) Int. Cl.
*H04B 11/00* (2006.01)
*G08C 23/02* (2006.01)
*B64G 1/22* (2006.01)
*B64G 1/42* (2006.01)

(52) U.S. Cl.
CPC ............... *H04B 11/00* (2013.01); *B64G 1/22* (2013.01); *G08C 23/02* (2013.01); *B64G 1/42* (2013.01)

(58) Field of Classification Search
CPC . H04B 11/00; B64G 1/22; B64G 1/42; G08C 23/02; G04B 21/00
See application file for complete search history.

(56) References Cited

U.S. PATENT DOCUMENTS

| 3,753,221 | A | 8/1973 | Stevens |
| 4,442,515 | A | 4/1984 | Meitzler |
| 5,982,297 | A | 11/1999 | Welle |
| 6,999,857 | B1 | 2/2006 | Kasper et al. |
| 7,525,398 | B2 * | 4/2009 | Nishimura ............. H04B 11/00 310/323.02 |
| 9,054,826 | B2 * | 6/2015 | Lawry ................... H04L 5/0046 |
| 9,146,266 | B2 * | 9/2015 | Badami ................ G01N 29/043 |
| 2012/0127833 | A1 | 5/2012 | Ghen et al. |
| 2016/0218408 | A1 | 7/2016 | Saito et al. |

FOREIGN PATENT DOCUMENTS

DE 4013978 11/1991

OTHER PUBLICATIONS

European Search Report, European Application No. 18173005 dated Nov. 9, 2018.
Wilt, Kyle. "Through Wall Data and Power Delivery Using Ultrasound"; Passive Wireless Sensor Technology Workshop, The Ultrasonic Through-Wall Communications Group at Rensselar, May 2015.
Yang, et al. "Through-Metal-Wall Power and Delivery and Data Transmission for Enclosed Sensors: A Review"; MDPI, Sensors Journal, vol. 15, pp. 31581-31605, doi: 10.3390/s151229870.

* cited by examiner

*Primary Examiner* — Ian J Lobo
(74) *Attorney, Agent, or Firm* — Perman & Green, LLP

(57) ABSTRACT

A spacecraft including a frame including a joint coupling a first frame portion to a second frame portion, and an acoustic communication system configured to transfer acoustic data signals across the joint between the first frame portion and the second frame portion.

20 Claims, 10 Drawing Sheets

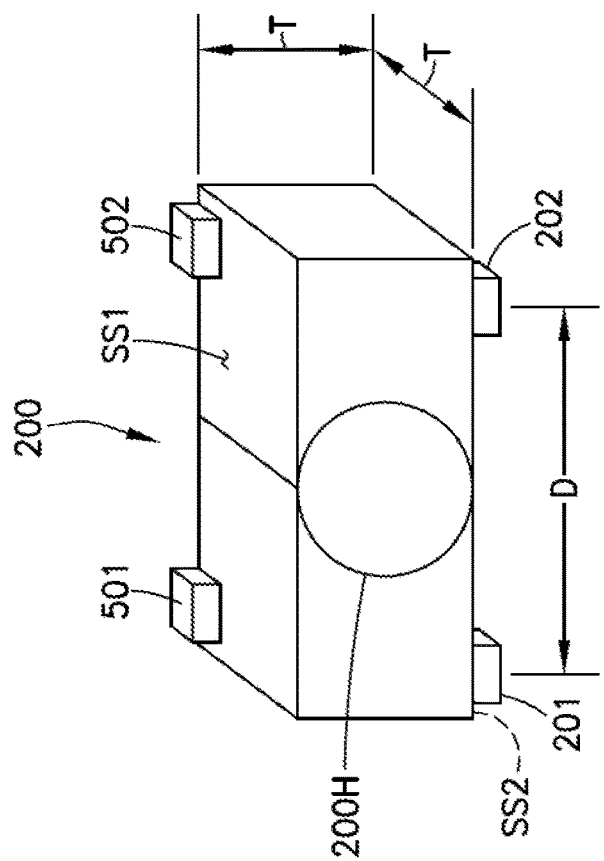
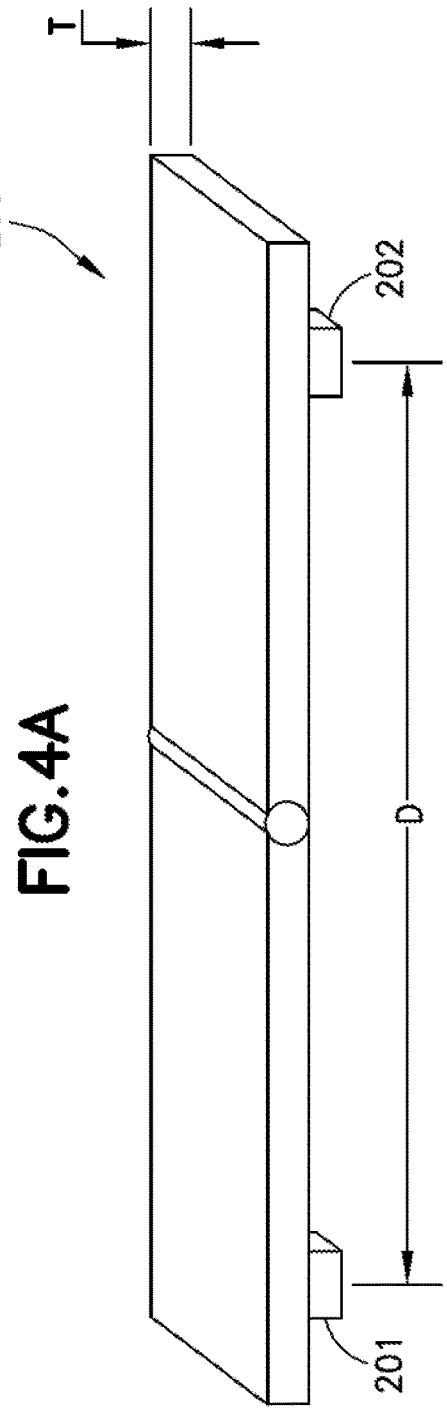
FIG.4A
FIG.4B

VEHICLE COMMUNICATION SYSTEM AND METHOD

BACKGROUND

1. Field

The aspects of the present disclosure generally relate to communication systems and in particular, acoustic communication systems.

2. Brief Description of Related Developments

Generally communication systems within a vehicle include numerous wires connecting various pieces of equipment to each other. For example, vehicles may include hundreds or thousands of sensors (e.g. thermocouples, voltage sensors, gyroscopic sensors, etc.) and switches whose values must be monitored. Some of these sensors and switches may only need to be monitored at low rates, such as once per second or even once per vehicle lifetime. Generally, one or two wires couple one or more of a vehicle processor, data logger, or telemetry aggregator to each of the sensors and/or switches. The use of wires, especially for the sensors and switches that are monitored at low rates, imposes substantial cost in weight, wire harness fabrication, installation and checkout (e.g., inspection for such things as electromagnetic interference testing and electromagnetic compatibility testing).

To alleviate the costs associated with wired transmissions, wireless communication systems have been used in vehicles. These wireless communication systems include fiber-optic, radio, and free-space optical signals; however, each of these systems has its own deficiencies. For example, optical fibers tend to become opaque with prolonged exposure to ionizing radiation, such as found in Earth orbit. Short distance radio technology, such as Bluetooth, include transmitters and receivers that must be electrically powered and are typically heavier, over short distances, than the wires they replace, especially if the radio transmitters and receivers are sufficiently of a narrow band as to not interfere with other communication signals on the vehicle. Free-space optical communication systems also require electrical power and are generally not useful between parts of a vehicle that lack clear line of sight to each other.

Transmission of communication signals has also been performed using acoustic waves travelling through a structure of a vehicle, such as through a hull of a maritime vessel. However, such acoustic transmission through the structure has been used over short distances, such as through the thickness of the hull, due to the acoustic transmission being susceptible to acoustic interference, e.g. noise, etc.

SUMMARY

The following is a non-exhaustive list of examples, which may or may not be claimed, of the subject matter according to the present disclosure.

One example of the subject matter according to the present disclosure relates to a spacecraft comprising: a frame including a joint coupling a first frame portion to a second frame portion; and an acoustic communication system configured to transfer acoustic data signals across the joint between the first frame portion and the second frame portion.

Another example of the subject matter according to the present disclosure relates to a spacecraft comprising: a first frame portion; a second frame portion; a joint coupling the first frame portion to the second frame portion so as to form an acoustic data transmission conduit between the first frame portion and the second frame portion, the deployable joint being configured to form the acoustic data transmission conduit in a zero gravity environment; and an acoustic communication system configured to transfer acoustic data signals across the deployable joint between the first frame portion and the second frame portion.

Still another example of the subject matter according to the present disclosure relates to a method for acoustic data transmission in a zero gravity environment, the method comprising: forming an acoustic data transmission conduit with a joint, a first frame portion and a second frame portion where the joint movably couples the first frame portion and the second frame portion so that the first frame portion and the second frame portion are biased, in the zero gravity environment, in acoustic coupling contact; and transmitting acoustic data signals from the first frame portion to the second frame portion through the joint.

BRIEF DESCRIPTION OF THE DRAWINGS

Figure 1:
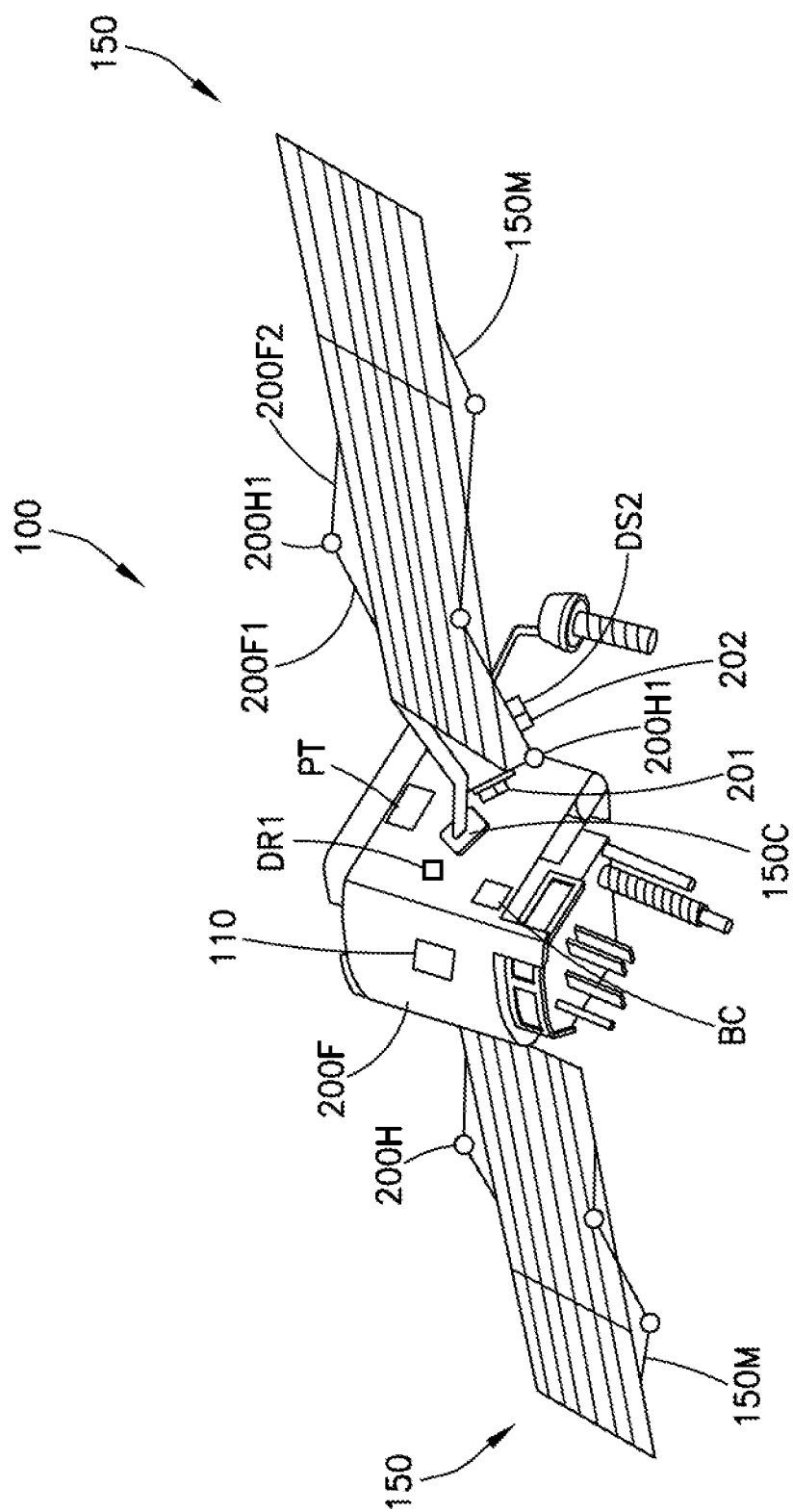
Figure 2:
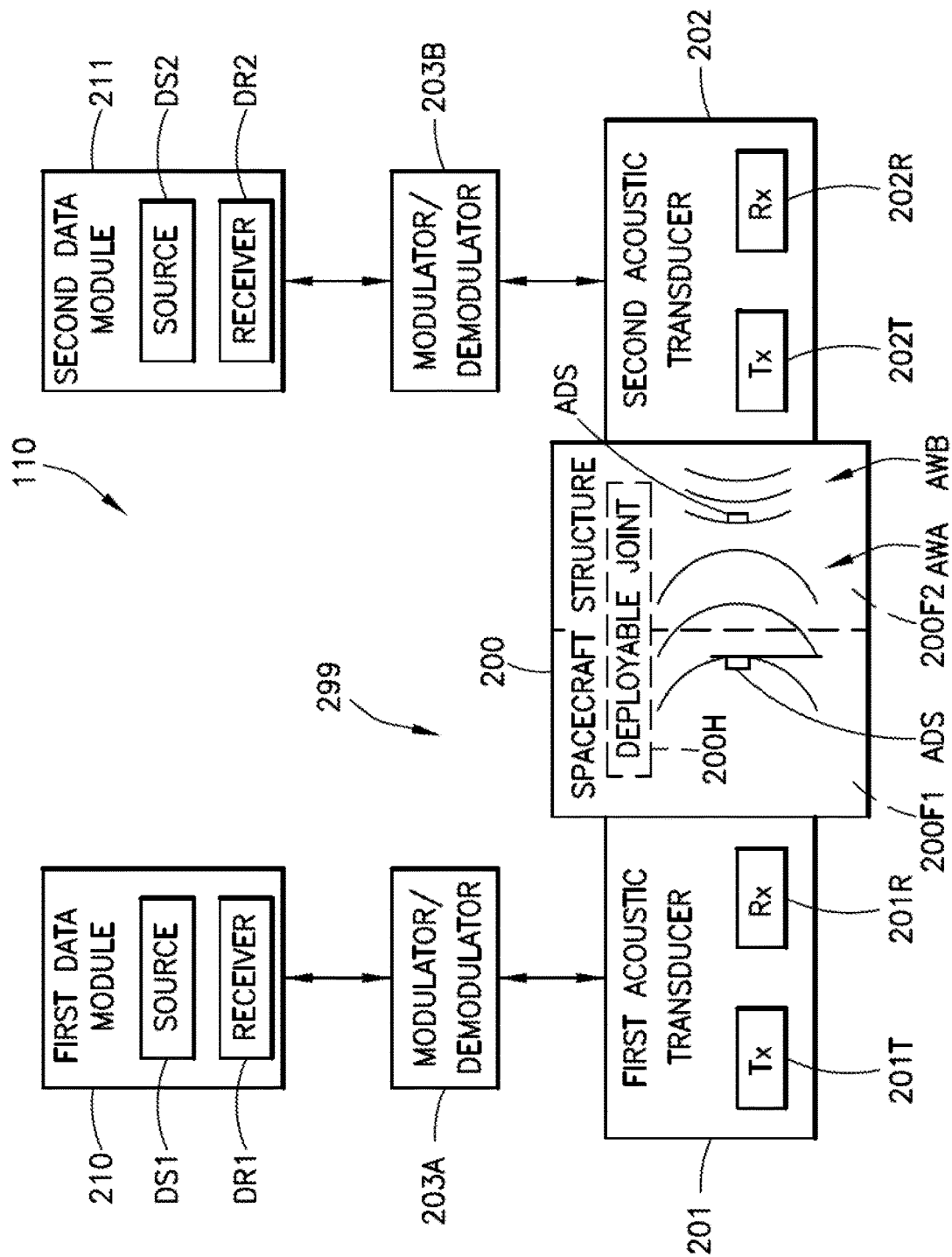
Figure 3A:
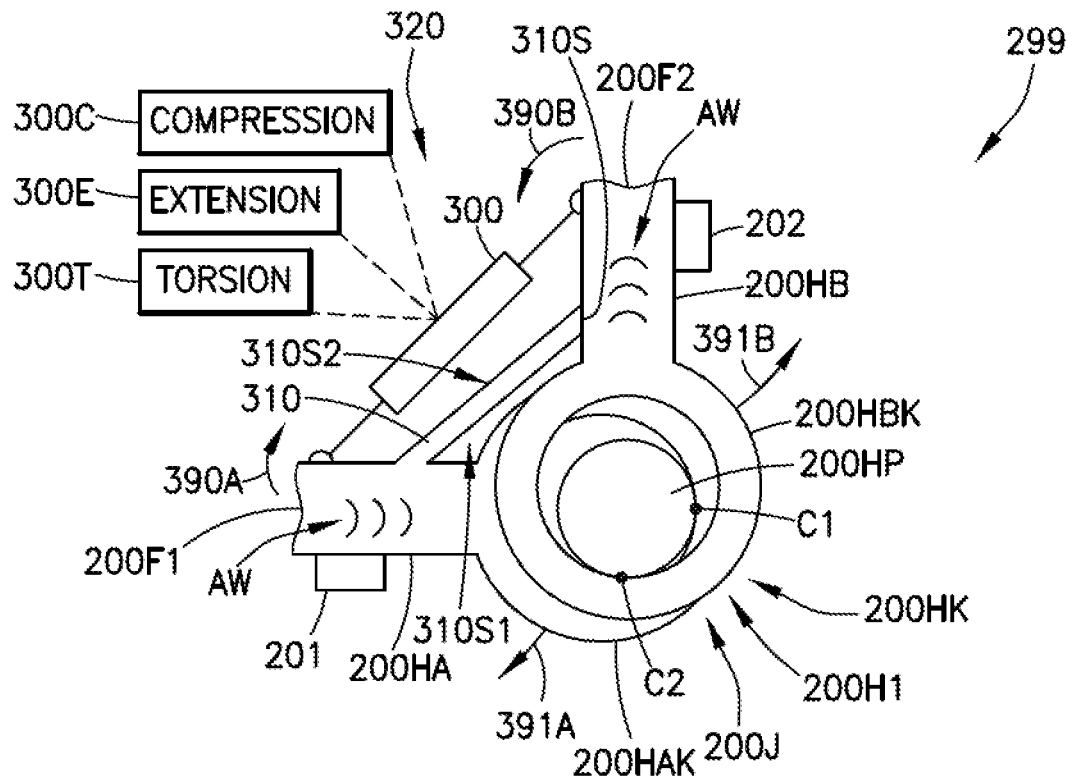
Figures 3B, 3C:
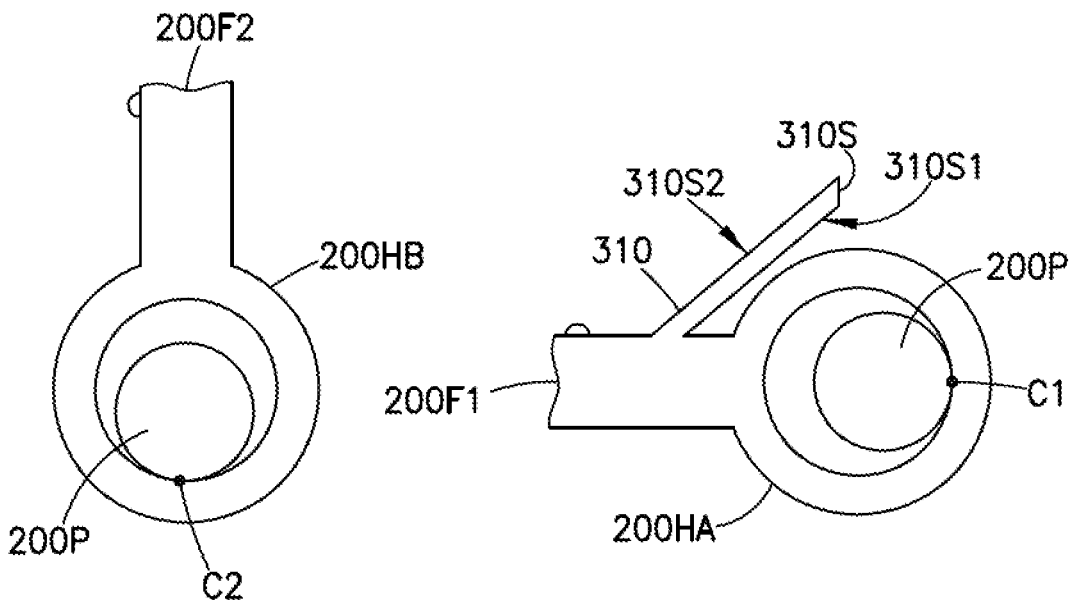
Figure 3D:
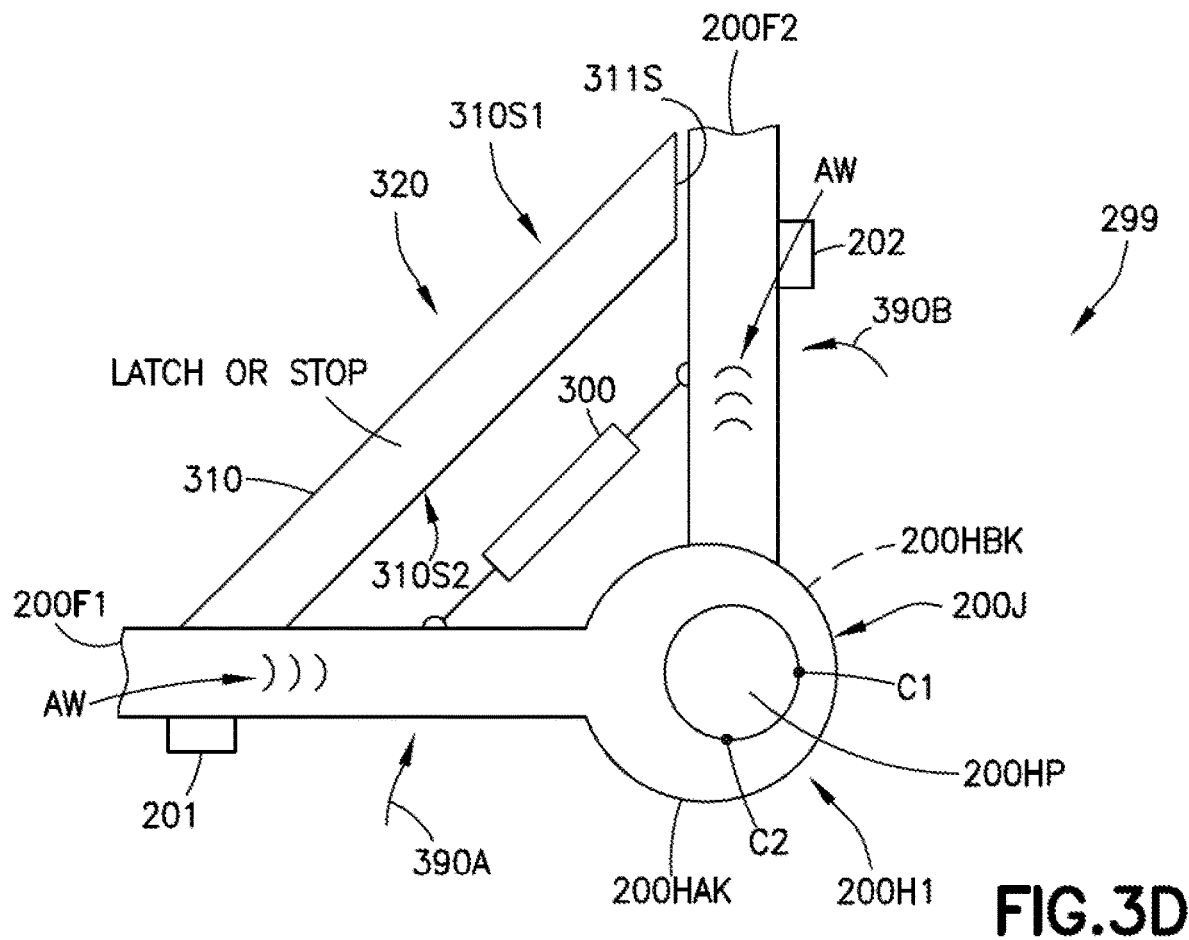
Figure 3E:
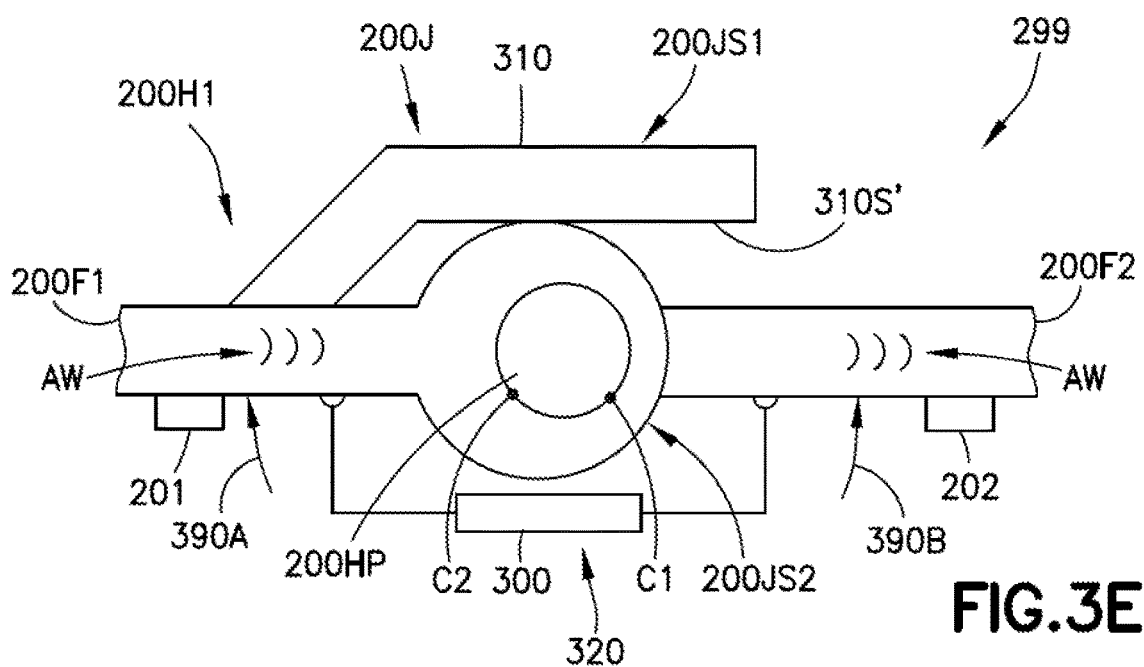
Figure 3F:
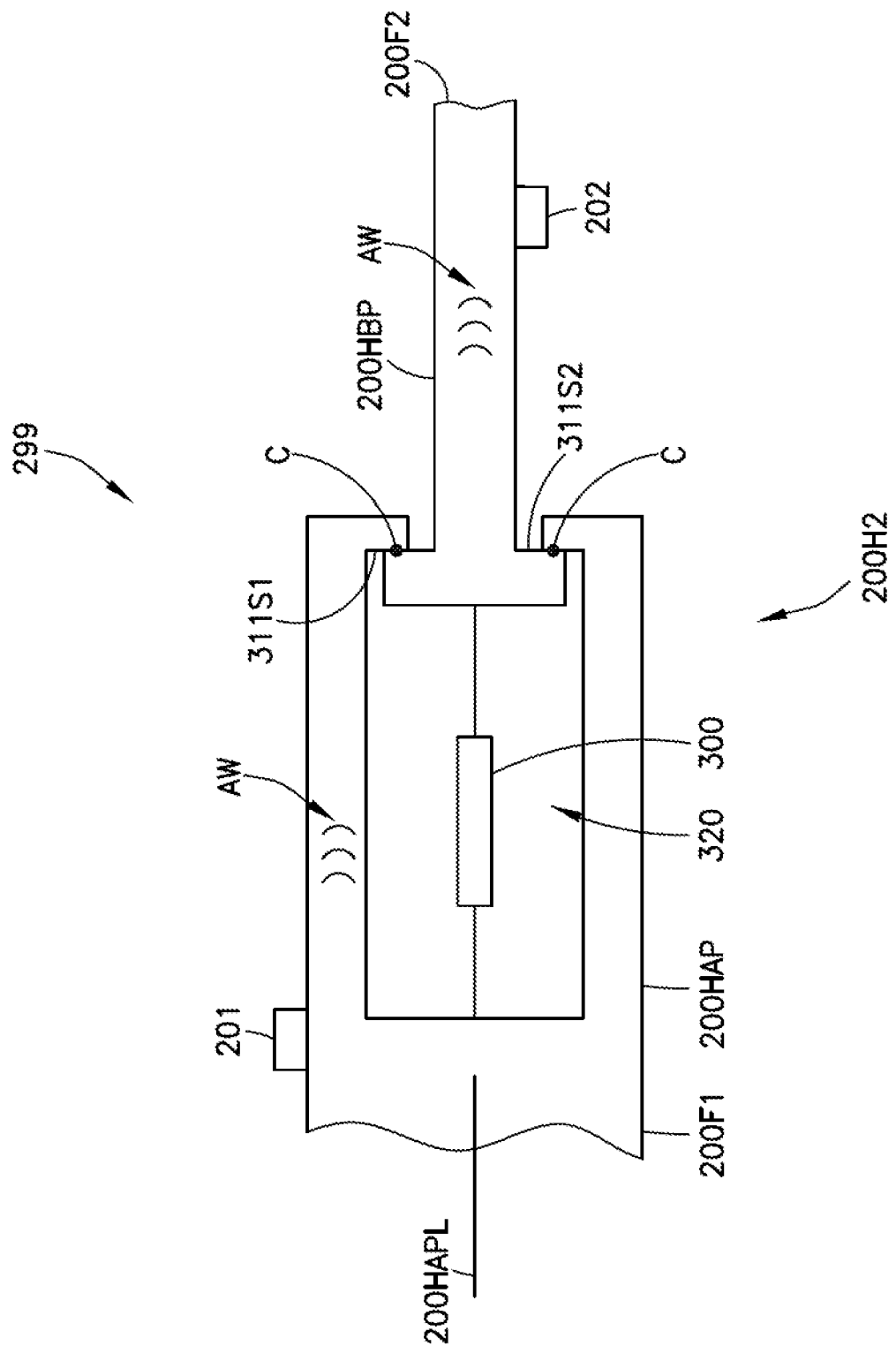
Figure 4:
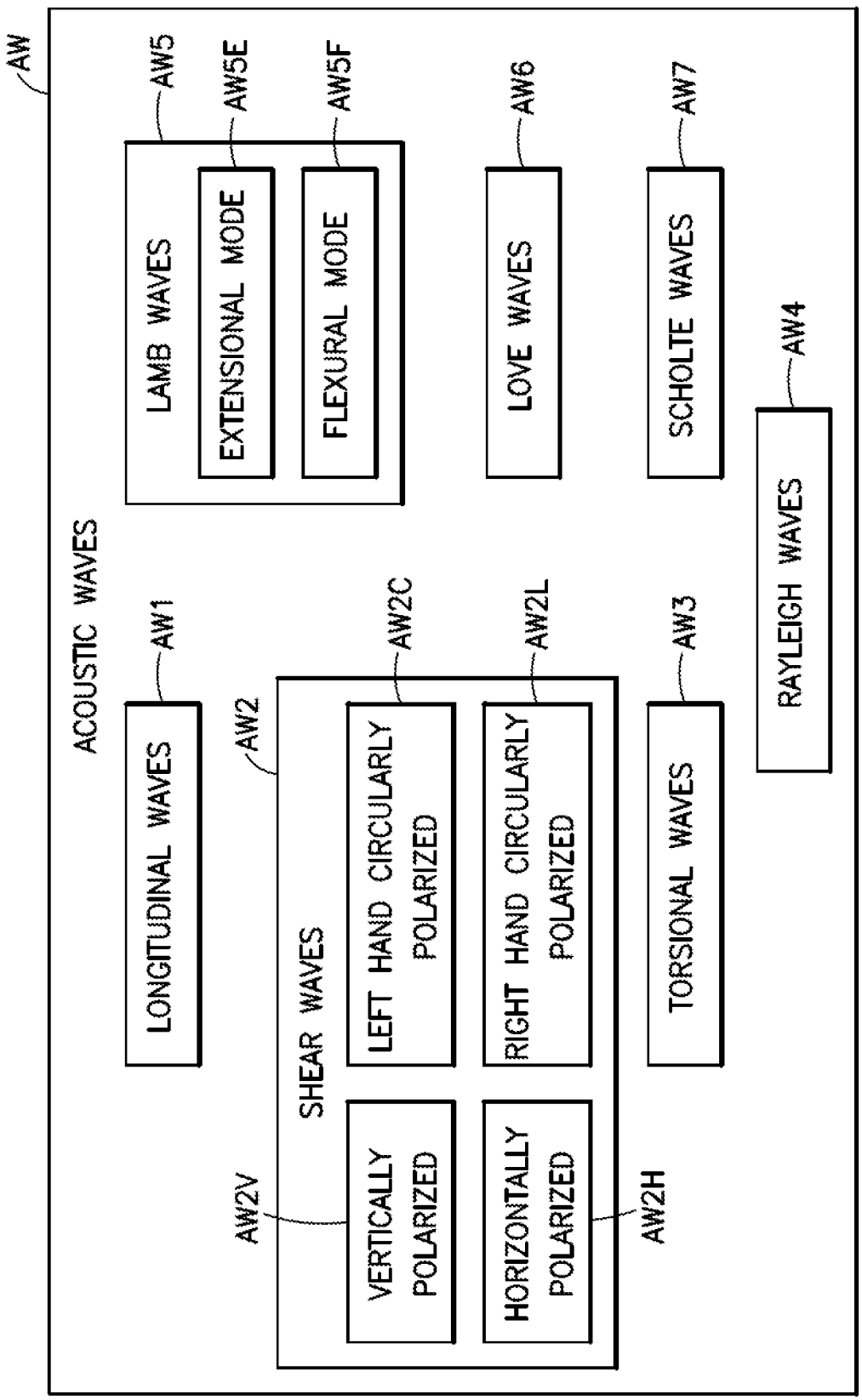
Figure 5A:
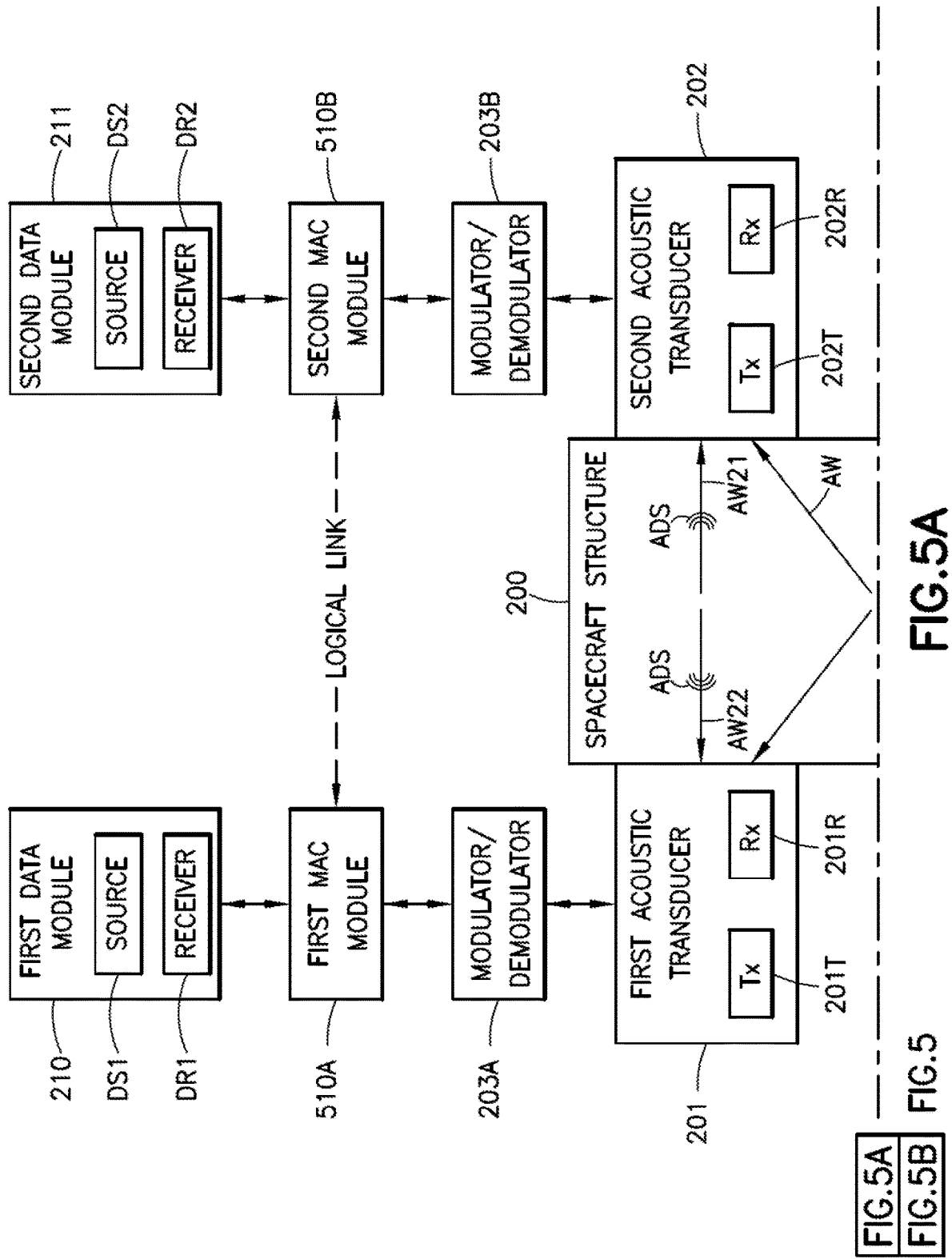
Figure 5B:
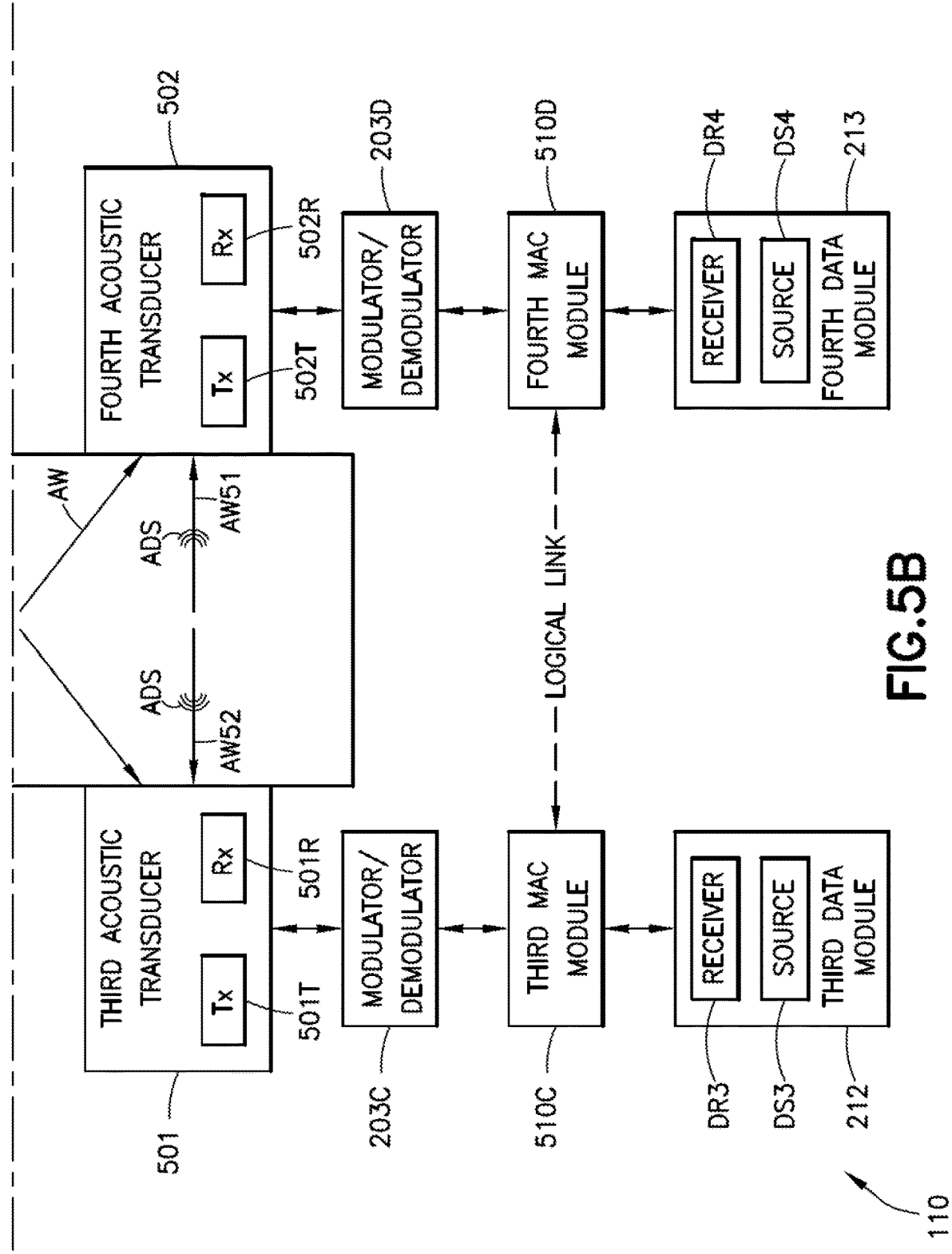
Figure 6:
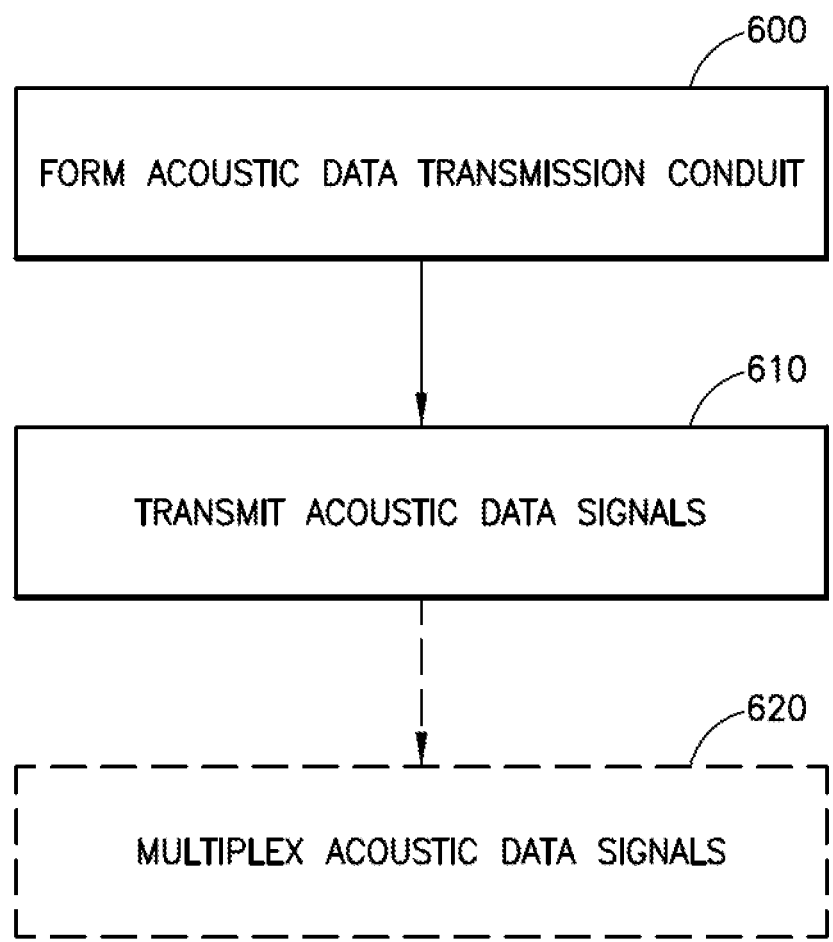

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of a spacecraft incorporating an acoustic data transmission conduit in accordance with aspects of the present disclosure;

FIG. 2 is a schematic illustration of an acoustic data transmission system in accordance with aspects of the present disclosure;

FIG. 3A is a schematic illustration of an acoustic data transmission conduit in accordance with aspects of the present disclosure;

FIG. 3B is a schematic illustration of a portion of the acoustic data transmission conduit of FIG. 3A in accordance with aspects of the present disclosure;

FIG. 3C is a schematic illustration of a portion of the acoustic data transmission conduit of FIG. 3A in accordance with aspects of the present disclosure;

FIG. 3D is a schematic illustration of an acoustic data transmission conduit in accordance with aspects of the present disclosure;

FIG. 3E is a schematic illustration of an acoustic data transmission conduit in accordance with aspects of the present disclosure;

FIG. 3F is a schematic illustration of an acoustic data transmission conduit in accordance with aspects of the present disclosure;

FIG. 4 is a schematic illustration of an acoustic wave(s) in accordance with aspects of the present disclosure;

FIG. 4A is a schematic illustration of a portion of the spacecraft of FIG. 1 in accordance with aspects of the present disclosure;

FIG. 4B is a schematic illustration of a portion of the spacecraft of FIG. 1 in accordance with aspects of the present disclosure;

FIG. 5 (which comprises FIG. 5A and FIG. 5B) is a schematic illustration of a multiplexer in accordance with aspects of the present disclosure; and FIG. 6 is a flow diagram of a method in accordance with aspects of the present disclosure.

DETAILED DESCRIPTION

Referring to FIG. 1, the aspects of the present disclosure provide a wireless communication system for zero gravity, vacuum environments, such as for example, orbital environments around the Earth (referred to herein for exemplary purposes only as an orbital environment). In particular, the wireless communication system is an acoustic communication system 110 for intra-vehicle communications. The acoustic communication system 110 transmits communication signals from one location of a vehicle, such as spacecraft 100, to another location of the spacecraft 100 by passing acoustic waves AWA, AWB (see FIG. 2 but generally referred to herein as acoustic waves AW) through a structure, such as a spacecraft structure 200 (e.g., the spacecraft frame 200F or other structure of the spacecraft).

A typical spacecraft 100 has hundreds or thousands of sensors whose values/data must be monitored at low rates, once per second or as low as once per the lifetime of the spacecraft 100. The intra-vehicle acoustic data transmission of the acoustic communication system 110 transmits the low rate data without the use of wires. For example, the spacecraft structure 200 can propagate a variety of acoustic modes, each of which may be modulated to carry data. Further, as the spacecraft structure 200 functions in an acoustically silent environment there is little to no acoustic interference from environmental noises. However, because of the orbital environment, structural couplings that typically provide reliable acoustic coupling (e.g., the ability to transmit acoustic waves across a coupling between two structures) when subjected to gravity do not provide the same or a reliable acoustic coupling when in the orbital environment. Thus, the use of acoustic data transmission is precluded. For example, a hinge includes a hinge pin and two hinge leafs that are pivotally coupled to the hinge pin by a respective knuckle. To allow each leaf to pivot about the hinge pin, the knuckles provide a clearance fit between the knuckles and the hinge pin (i.e., when the hinge pin is centered within a knuckle, clearance exists around the circumference of the hinge pin, between the knuckle and the pin). When subjected to gravity, gravitational force pulls on each leaf holding the knuckles against the hinge pin providing reliable acoustic conductivity. However, in a vacuum environment there is no gravitational force to hold the knuckles against the pin (i.e., each leaf "floats" relative to the hinge pin), so that the clearance fit between the knuckles and the hinge pin precludes reliable acoustic conductivity. As will be described below, the aspects of the present disclosure may provide for a reliable acoustic coupling between two structures/portions of the spacecraft structure 200 in the orbital environment.

Referring to FIG. 1 the aspects of the present disclosure may be applied to any suitable spacecraft 100 such as, for example, satellites, space capsules, space shuttles, and/or manned or unmanned space vehicles. Generally the spacecraft 100 includes a frame 200F, which forms at least part of the spacecraft structure 200. The spacecraft structure 200 may include solar panel arrays 150 that are extendable and/or retractable relative to the frame 200F, antennae, and/or other fixed or movable structures. The solar panel arrays 150 will be used for exemplary purposes in describing a deployable portion of the spacecraft structure 200. The solar panel arrays 150 generally include structural support members 150M that are coupled to each other through any suitable joint 200H including but not limited to a hinged/articulated joint 200H1 (see FIGS. 3A-3E) and a telescopic joint 200H2 (see FIG. 3F) where the joints 200H, 200H1, 200H2 are deployed/articulated when the deployable portion of the spacecraft structure 200 is deployed.

Referring to FIGS. 1 and 2, the acoustic communication system 110 includes a first data module 210 and a second data module 211. The first data module 210 includes one or more of a source DS1 and a receiver DR1. The source DS1 is configured to generate data while the receiver DR1 is configured to receive data. The first data module 210 is coupled to a first modulator/demodulator 203A. The first modulator/demodulator 203A is coupled to a first acoustic transducer 201. The first modulator/demodulator 203A may be any suitable modulator/demodulator configured to one or more of modulate a baseband signal useable by the first data module 210 to an acoustic signal usable by the first acoustic transducer 201, and demodulate an acoustic signal usable by the first acoustic transducer 201 to a baseband signal useable by the first data module 210. The first acoustic transducer 201 includes one or more of a transmitter 201T and a receiver 201R. The transmitter 201T is configured to generate acoustic signals and the receiver 201R is configured to receive acoustic signals. The first acoustic transducer 201 is coupled to the spacecraft structure 200, so that acoustic waves/signals AWA generated by the transmitter 201T propagate through the spacecraft structure 200, and so that acoustic waves AWB propagating through the spacecraft structure 200 are received by the receiver 201R.

Still referring to FIGS. 1 and 2, the second data module 211 includes one or more of a source DS2 and a receiver DR2. The source DS2 is configured to generate data while the receiver DR2 is configured to receive data. The second data module 211 is coupled to a second modulator/demodulator 203B. The second modulator/demodulator 203B is coupled to a second acoustic transducer 202. The second modulator/demodulator 203B may be any suitable modulator/demodulator configured to one or more of modulate a baseband signal useable by the second data module 211 to an acoustic signal usable by the second acoustic transducer 202, and demodulate an acoustic signal usable by the second acoustic transducer 202 to a baseband signal useable by the second data module 211. The second acoustic transducer 202 includes one or more of a transmitter 202T and a receiver 202R. The transmitter 202T is configured to generate acoustic signals and the receiver 202R is configured to receive acoustic signals. The second acoustic transducer 202 is coupled to the spacecraft structure 200 so that acoustic waves/signals AWB generated by the transmitter 201T propagate through the spacecraft structure 200, and so that acoustic waves AWA propagating through the spacecraft structure 200 are received by the receiver 201R.

Referring now to FIGS. 1, 3A, 3B, 3C, 3D, 3E and 3F, the first acoustic transducer 201 and the second acoustic transducer 202 are separated from each other by the spacecraft structure 200. In one aspect, the first acoustic transducer 201 and the second acoustic transducer 202 are separated by a portion of the spacecraft structure 200 that is substantially rigid (e.g., unarticulated or fixed with no moving parts—as illustrated in FIG. 2); while in other aspects the first acoustic transducer 201 and the second acoustic transducer 202 are separated by a deployable portion of the spacecraft structure 200 (such as on opposite sides of the articulated/hinged joint 200H1 illustrated in FIGS. 3A-3E or on opposite sides of the telescopic joint 200H2 illustrated in FIG. 3F). As described above, because of the orbital environment, structural couplings that typically provide reliable acoustic coupling (e.g., the ability to transmit acoustic waves across a coupling between two structures) when subjected to gravity do not provide the same or a reliable acoustic coupling when in the orbital environment. Thus, the use of acoustic data transmission is precluded.

Referring to FIGS. 2, 3A, 3B, 3C, 3D, 3E and 3F, in accordance with the aspects of the present disclosure, the joint(s) 200H described herein provide a low impedance acoustic coupling between a first frame portion 200F1 and a second frame portion 200F2 that are movably coupled to one another. In one aspect, the first frame portion 200F1 and the second frame portion 200F2 form structural support members 150M (see FIG. 1) of the spacecraft 100, such as those that support solar panel arrays 150. The joint(s) 200H form a part of the acoustic communication system 110. For example, the first acoustic transducer 201 is coupled to the first frame portion. 200F1 and the second acoustic transducer 202 is coupled to the second frame portion 200F2 so that acoustic data signals embodied in the acoustic waves AW, AWA, AWB (see also FIG. 4) are transmitted across the joint(s) 200H between the first frame portion 200F1 and the second frame portion 200F2. For example, each joint 200H of the acoustic communication system 110 includes a forced coupling system 320 (see FIGS. 3A-3E and 3F) that is configured to bias the first frame portion 200F1 against the second frame portion 200F2, in the zero gravity environment, to form an acoustic data transmission conduit 299 from the first frame portion 200F1 to the second frame portion 200F2.

Referring to FIGS. 3A-3E, in one aspect, the joint 200H is an articulated/hinged joint 200H1 that includes a hinge pin 200HP, a first hinge leaf 200HA, and a second hinge leaf 200HB. The a hinge pin 200HP, a first hinge leaf 200HA, and a second hinge leaf 200HB form a pivot joint 200J. The first hinge leaf 200HA is coupled to or otherwise forms a portion of the first frame portion 200F1. The first hinge leaf 200HA includes a first knuckle portion 200HAK that pivotally couples the first hinge leaf 200HA to the hinge pin 200HP. The second hinge leaf 200HB is coupled to or otherwise forms a portion of the second frame portion 200F2. The second hinge leaf 200HB includes a second knuckle portion 200HBK that pivotally couples the second hinge leaf 200HB to the hinge pin 200HP.

Referring to FIGS. 3A-3C, in one aspect, the forced coupling system 320 of the joint 200H1 includes a lever arm 310 and a biasing member 300. The lever arm 310 is coupled to one of the first frame portion 200F1 (and/or first hinge leaf 200HA) and the second frame portion 200F2 (and/or the second hinge leaf 200HB). In FIGS. 3A-3C the lever arm 310 is shown coupled to the first frame portion 200F1 for exemplary purposes only. The biasing member 300 is coupled to both the first frame portion 200F1 (and/or first hinge leaf 200HA) and the second frame portion 200F2 (and/or the second hinge leaf 200HB). In one aspect, the biasing member 300 is one or more of a compression biasing member 300C, an extension biasing member 300E, a torsion biasing member 300T, or any other suitable biasing member configured to bias the joint 200H into a low impedance acoustic coupling as described herein.

In one aspect, still referring to FIGS. 3A-3C, the lever arm 310 and the biasing member 300 are spatially arranged so that the pivot joint 200J of the joint 200H1 is disposed on a first side 310S1 of the lever arm 310 and the biasing member 300 is disposed on a second side 310S2 of the lever arm 310, where the first side 310S1 is opposite the second side 310S2. In this aspect, the biasing member 300 may provide compression or torsional forces so that the first frame portion 200F1 and the second frame portion 200F2 are biased toward each other in directions 390A, 390B (FIG. 3A) about hinge pin 200HP. The first frame portion 200F1 and the second frame portion 200F2 pivot about pivot joint 200j so that a stop surface 311S of the lever arm 310 contacts the second frame portion 200F2 and arrests/stops the pivoting movement of the first frame portion 200F1 and the second frame portion 200F2 in directions 390A, 390B. The lever arm 310 acts as a fulcrum about which the first knuckle portion 200HAK and the second knuckle portion 200HBK pivot in respective directions 391A, 391B (FIG. 3A). The pivoting of the first knuckle portion 200HAK and the second knuckle portion 200HBK pivot in the respective directions 391A, 391B (FIG. 3A) forces or otherwise biases the first truckle portion 200HAK and the second knuckle portion 200HBK against the hinge pin 200HP so that contact points C1, C2 are formed. The contact points C1, C2 form a low impedance acoustic pathway between each of the first knuckle portion 200HAK, the second knuckle portion 200HBK, and the hinge pin 200HP so that the acoustic waves AW may reliably pass between the first frame portion 200F1 and the second frame portion 200F2. The low impedance acoustic pathway has a low resistance to acoustic transmission and is formed through the first knuckle portion 200HAK, the second knuckle portion 200HBK, and the hinge pin 200HP. In this aspect, the contact points C1, C2 provide suitable/sufficient contact between the first knuckle portion 200HAK, the second knuckle portion 200HBK, and the hinge pin 200HP so that the acoustic waves AW may reliably pass between the first frame portion 200F1 and the second frame portion 200F2.

Referring to FIG. 3D, in one aspect, the lever arm 310 and biasing member 300 are spatially arranged so that the pivot joint 200J of the joint 200H1 and the biasing member 300 are disposed on a common side (e.g., side 310S2) of the lever arm 310. In this aspect, the biasing member 300 may be a compression biasing member 300C and/or a torsion biasing member 300T configured to pivot the first frame portion 200F1 and the second frame portion 200F2 in directions 390A, 390B about hinge pin 200HP to form the contact points C1, C2 as described above.

Referring to FIG. 3E, the lever arm 310 and biasing member 300 are spatially arranged so that the lever arm 310 is disposed on a first side 200JS1 of the pivot joint 200J of the joint 200H1 and the biasing member 300 is disposed on a second side 200JS2 of the pivot joint 200J of the joint 200H1, where the first side 200JS1 is opposite the second side 200JS2. In this aspect, the biasing member 300 may be an extension biasing member 300E acid/or a torsion biasing member 300T configured to pivot the first frame portion 200F1 and the second frame portion 200F2 in directions 390A, 390B about hinge pin 200HP to form the contact points C1, C2 as described above.

Referring to FIG. 3F, in one aspect, the joint 200H is a telescopic joint 200H2 that includes a first joint portion 200HAP and a second joint portion 200HBP. The first joint portion 200HAP is coupled to or otherwise forms part of the first frame portion 200F1 and includes a longitudinal axis 200HAPL. The second joint portion 200HBP is coupled to or otherwise forms part of the second frame portion 200F2. The second joint portion 200HBP is configured to move axially along the longitudinal axis 200HAPL of the first joint portion 200HAP so as to form the telescoping joint 200H2. In this aspect, the forced coupling system 320 of the joint 200H2 includes the biasing member 300, a first stop surface 311S1, and a second stop surface 311S2. The first stop surface 311S1 is formed by the first joint portion 200HAP and the second stop surface 311S2 is formed by the second joint portion 200HBP. The first stop surface 311S1 and the second stop surface 31152 are configured to engage one another so as to arrest relative movement between the first joint portion 200HAP and the second joint portion 200HBP. The biasing member 300 may be disposed between the first joint portion 200HAP and the second joint portion 200HBP to force contact between the first stop surface 311S1 and the second stop surface 311S2 so that contact point C is formed. The contact point C may be a peripheral contact ring of low acoustic impedance that may provide for reliable transmission of the acoustic waves AW between the first frame portion 200F1 and the second frame portion 200F2.

Referring again to FIGS. 3A-3F, in one aspect, the biasing member 300 provides sufficient force to deploy the joints 200H1, 200H2 (generally referred to herein as joints 200H). As noted above, the joints 200H may be deployed to extend solar panel arrays 150, deploy antennae, or deploy any other suitable structure of the spacecraft 100. In another aspect, any suitable motor may be provided on the spacecraft 100 for deployment of the joints 200H where the biasing member 300 serves to exert a constant force on the first frame portion 200F1 and the second frame portion 200F2 to maintain the low impedance contact points C (FIG. 3F), C1, and C2 (FIGS. 3A-3E).

Referring again to FIG. 2 as well as FIGS. 4, 4A and 4B, the acoustic communication system 110 is configured to transfer acoustic data signals ADS, that are embodied in the acoustic waves AWA, AWB (generally referred to herein as acoustic waves AW), across the joint 200H in the form of longitudinal waves AW1, shear waves AW2, torsional waves AW3, Rayleigh waves AW4, lamb waves AW5, love waves AW6 and/or Scholte waves AW7.

The longitudinal waves AW1 (or compression waves) are a type of body wave akin to sound waves that travel through air and/or water. Longitudinal waves AW1 are useful when the thickness T of the spacecraft structure 200 that conveys the acoustic data signals ADS is similar to or greater than the distance from D between, for example, the first acoustic transducer 201 and the second acoustic transducer 202. In one aspect, the thickness t is measured in both directions perpendicular to the distance D.

Shear waves AW2 are another type of body wave. Shear waves AW2 include circularly polarized (e.g., left-hand circularly polarized AW2C and right-hand circularly polarized AW2L) shear waves AW2, vertically polarized AW2V shear waves AW2, and horizontally polarized AW2H shear waves AW2. Because shear waves AW2 are polarized, the shear waves AW2 allow two separate data streams (e.g., one carried by left-hand circularly polarized AW2C shear waves AW2 and the other carried by right-hand circularly polarized AW2L shear waves AW2, or in another alternative, one carried by vertically polarized AW2V shear waves AW2 and the other carried by horizontally polarized AW2H shear waves AW2) to be sent along a common path at the same time without interference. Shear waves AW2 are useful when the thickness T of the structure that conveys the acoustic data signal ADS is similar to or greater than the distance from D between, for example, the first acoustic transducer 201 and the second acoustic transducer 202.

Torsional waves AW3 may be used when the first acoustic transducer 201 and the second acoustic transducer 202 are separated along straight, narrow structures such as, e.g., sensor masts, radioisotope thermoelectric generator (RTG) masts, taught springs, or guy lines.

Rayleigh waves AW4 are a type of surface wave that propagates on one surface SS1, SS2 (see FIG. 4A) of a thick solid, such as any suitable portion of the spacecraft structure 200. Rayleigh waves AW4 combine longitudinal and transverse motion, where the transverse motion is perpendicular to the surface (i.e., into and out of the surface, not parallel to it). Rayleigh waves AW4 may be used when points the first acoustic transducer 201 and the second acoustic transducer 202 are on the same surface (e.g., surface SS2) of a thick piece of spacecraft structure 200. Rayleigh waves AW4 may also be used for connecting multiple pairs of acoustic transducers where each acoustic transducer pair (e.g., the first and second acoustic transducers 201, 202 may form a first acoustic transducer pair, while a third and fourth acoustic transducers 501, 502 form a second acoustic transducer pair) is on a different surface SS1, SS2 of the same structural element of the spacecraft: structure 200 that has rectangular cross-section: a Rayleigh wave on one surface SS1 creates little or no crosstalk that could interfere with communication along another surface SS2.

Lamb waves AW5 may be used when the first acoustic transducer 201 and the second acoustic transducer 202 are on a structural plate of the spacecraft structure 200 (as illustrated in FIG. 4B) and the thickness T of structural plate of the spacecraft structure 200 is much thinner than the distance D between the first acoustic transducer 201 and the second acoustic transducer 202. Lamb waves AW4 have two modes, an extensional mode AW5E and a flexural mode AW5F, which can be used to transmit two independent acoustic data signals ADS, in a manner similar to that of the left-hand circularly polarized AW2C and right-hand circularly polarized AW2L shear waves AW2.

Love waves AW6 are a transverse surface wave. Love waves may be used when the first acoustic transducer 201 and the second acoustic transducer 202 are on a portion of the spacecraft structure 200 that has a relatively low-stiffness material on its surface and a high-stiffness material in its bulk. This is often the case with portions of the spacecraft structure that are painted or coated.

Scholte waves AW7 are similar to Rayleigh waves AW4; however, Scholte waves AW7 propagate along a solid-liquid surface. Scholte waves AW7 may be used when the first acoustic transducer 201 and the second acoustic transducer 202 are on a solid-liquid surface such as the inner surface of a propellant tank PT (FIG. 1) or inside a battery cell BC (FIG. 1), where the propellant tank and battery cell form a part of the spacecraft structure 200.

In accordance with aspects of the present disclosure, the spacecraft structure 200 may be configured to limit propagation of acoustic waves AW from one portion of the spacecraft structure to another portion of the spacecraft structure. Limiting propagation of the acoustic waves AW may be performed to prevent interference in the acoustic data signals ADS. For example, referring to FIG. 1, the first acoustic transducer 201 and the second acoustic transducer 202 may be coupled to respective structural support members 150M of the solar panel array 150. To limit or otherwise prevent propagation of the acoustic waves AWA, AWB (see FIG. 2) transmitted/received by the first acoustic transducer 201 and the second acoustic transducer 202 to other portions of the spacecraft 100, the coupling 150C (FIG. 1) between the frame 200F and the solar panel array 150 is constructed of a high acoustic impedance material and/or a material having a low stiffness. The high acoustic impedance material or low stiffness material is configured to prevent acoustic waves AWA, AWB from travelling between the structural support members 150M and the frame 200F.

Referring to FIGS. 5A and 5B, in one aspect, the acoustic communication system 110 includes one or more media access control (MAC) modules 510A-510D coupled to at least respective ones of the first acoustic transducer 201 and the second acoustic transducer 202. The media access control modules 510A-514D are configured to multiplex acoustic waves AW21, AW22, AW51, AW52 (embodying a respective acoustic data signal ADS) between at least the first acoustic transducer 201 and the second acoustic transducer 202. For example, the acoustic communication system 110 includes the first acoustic transducer 201 in communication with the second acoustic transducer 202. The acoustic communication system 110 also includes a third acoustic transducer 501 in communication with a fourth acoustic transducer 502. The third acoustic transducer 501 and the fourth acoustic transducer 502 each include one or more of a respective transmitter 501T, 502T and a respective receiver 501R, 502R. A third data module 212 (including a receiver DR3 and a source DS3) and a demodulator 203C are coupled to the third acoustic transducer 501. A fourth data module 213 (including a receiver DR4 and a source DS4) and a demodulator 203D are coupled to the fourth acoustic transducer 502. The third data module 212, the receiver DR3, the source DS3, the demodulator 203C, the fourth data module 213, the receiver DR4, the source DS4, the demodulator 203D are substantially similar to those described above with respect to FIG. 2 and the first acoustic transducer 201 and the second acoustic transducer 202. The media access control modules 510A-510D are configured to prevent the acoustic waves AW21, AW22 transmitted/received between the first acoustic transducer 201 and the second acoustic transducer 202 from interfering with acoustic waves AW51, AW52 transmitted/received between third acoustic transducer 501 and the fourth acoustic transducer 502, and vice versa. For example, a first media access control module 510A is coupled to the first acoustic transducer 201 and a second media access control module 510B is coupled to the second acoustic transducer 202. Ally suitable logical link is provided between the first media access control module 510A and the second media access control module 510B. A third media access control module 510C is coupled to the third acoustic transducer 501 and a fourth media access control module 510D is coupled to the fourth acoustic transducer 502. Any suitable logical link is provided between the third media access control module 510C and the fourth media access control module 510C. The media access control modules 510A-510D are configured to multiplex the acoustic waves AW21, AW22, AW51, AW52 in any suitable manner. For example, the media access control modules 510A-510D are configured with any suitable media access control (MAC) strategies that separate the acoustic waves AW21, AW22, AW51, AW52. The MAC strategies include, but are not limited to, polarization of acoustic waves (such as with the shear waves AW2 and lamb waves AW5 described above); assigning separate acoustic data signals ADS different types of wave forms, such as the wave forms described above with respect to FIGS. 5A and 5B; frequency division multiplexing; code division multiplexing; and/or time division multiplexing where, for example, an acoustic transducer 201, 202, 501, 502 listens for a predetermined amount of time for collisions of acoustic waves AW21, AW22, AW51, AW52 to ensure delivery of the respective acoustic data signal ADS.

Referring now to FIGS. 1, 2, 5A, 5B and 6 an exemplary operation of the acoustic communication system 110 for acoustic data transmission in a zero gravity environment will be described in accordance with aspects of the present disclosure. An acoustic data transmission conduit 299 is formed (FIG. 6, Block 600) with a joint 200H (e.g., one or more of joint 200H1 and joint 200H2 illustrated in FIGS. 3A-3F), a first frame portion 200F1 and a second frame portion 200F2 (see also FIGS. 3A-3E). As described, the joint 200H movably couples the first frame portion 200F1 and the second frame portion 200F2 so that the first frame portion 200F1 and the second frame portion 200F2 are biased, in the zero gravity environment, in acoustic coupling contact at contact point(s) C, C1, C2 (see FIGS. 3A-3F). The acoustic data signals ADS embodied in the respective acoustic waves AWA, AWB, AW21, AW22, AW51, AW52 (generally acoustic waves AW) are transmitted (FIG. 6, Block 610) from the first frame portion 200F1 to the second frame portion 200F2 through the joint 200H (e.g., one or more of joint 200H1 and joint 200H2 illustrated in FIGS. 3A-3F). The transmission of the acoustic data signals includes transmitting the acoustic data signals ADS between the first acoustic transducer 201 coupled to the first frame portion 200F1 and the second acoustic transducer 202 coupled to the second frame portion 200F2. In other aspects, the acoustic data signals ADS may be transmitted between any suitable acoustic transducer pair (e.g., between the first and second acoustic transducer 201, 202, between the third and fourth transducer 501, 502 (FIGS. 5A and 5B), or any other suitable transducer pair).

In one aspect, the acoustic data signals ADS embodied in the respective acoustic waves AWA, AWB, AW21, AW22, AW51, AW52 (generally acoustic waves AW) are multiplexed (FIG. 6, Block 620) with the media access control module 510. In one aspect, different acoustic data signals ADS are separated, with the media access control module 510, by polarizing the different acoustic waves AWA, AWB, AW21, AW22, AW51, AW52 (generally acoustic waves AW) embodying the different acoustic data signals ADS (e.g., a first acoustic data signal may be assigned to be transmitted in a left-hand circularly polarized AW2C shear wave AW2 (FIG. 4) while a second acoustic data signal may be assigned to be transmitted in a right-hand circularly polarized AW2L shear wave AW2 (FIG. 4)). In one aspect, the different acoustic data signals ADS are separated, with the media access control module 510, by assigning the different acoustic data signals ADS to a respective predetermined acoustic signal type/wave form (e.g., a first acoustic data signal may be assigned to be transmitted in a longitudinal wave AW1 (FIG. 4) while a second acoustic data signal may be assigned to be transmitted in a shear wave AW2 (FIG. 4, 4)). As described above and referring to FIG. 4, the acoustic data signals ADS may be embodied in and transmitted as any suitable wave form such as, in the form of longitudinal waves AW1, shear waves AW2 (circularly and/or linearly polarized), torsional waves AW3, Rayleigh waves AW4, lamb waves AW5 (extensional and/or flexural modes), love waves AW6 and/or Scholte waves AW7.

As can be seen above and referring to FIGS. 1 and 2, the aspects of the present disclosure provide for acoustic data transmission in a zero gravity, vacuum environment through a joint 200H (such as a telescopic joint, articulated joint or any other suitable movable joint that may not provide low acoustic impedance in the zero gravity, vacuum environment. For example, the biasing member 300 and the lever arm 310 (see FIGS. 3A-3F) provide a substantially constant force on the joint 200H, which may result in low acoustic impedance through the joint 200H, regardless of whether the joint 200H is weightless. This substantially constant force applied by the biasing member 300 and leveraged by the lever arm 310 serves to ensure good acoustic conductance across the joint 200H, enabling reliable use of acoustic data transmission throughout the spacecraft structure 200 regardless of relative locations of the data producer (e.g., such as acoustic transducer 201) and the data consumer (e.g., such as acoustic transducer 202).

The aspects of the present disclosure may be utilized in spacecraft 100 that do not have high accuracy angular pointing requirements that might be disrupted by the tiny vibrations used for acoustic data transmission. However, in other aspects, where the spacecraft 100 is used for high accuracy angular pointing, portions of the spacecraft 100 using the acoustic data transmission as described herein may be isolated using any suitable dampers to allow for the acoustic data transmission in combination with high accuracy angular pointing.

The acoustic data transmission, in accordance with the aspects of the present disclosure, provides for an acoustic communication system 110 (FIG. 1) that weighs and costs less than an equivalent wired communication system. The reduced weight, compared to wired communication systems, results in lower costs to deliver the spacecraft 100 to orbit (e.g., reduced fuel use). The acoustic communication system 110 also saves time and cost during checkout, as the acoustic communication system 110 provides less risk of electromagnetic incompatibility or interference with other spacecraft 100 systems. The acoustic communication system 110 in accordance with the aspects of the present disclosure also has essentially no vulnerability to ionizing radiation, compared to fiber optic communications. The aspects of the present disclosure also provide for communication between parts of the spacecraft 100 that do not have clear line of sight with each other.

The following are provided in accordance with the aspects of the present disclosure:

A1. A spacecraft: comprising:
a frame including a joint coupling a first frame portion to a second frame portion; and
an acoustic communication system configured to transfer acoustic data signals across the joint between the first frame portion and the second frame portion.

A2. The spacecraft of paragraph A1, wherein the joint includes a forced coupling system configured to bias the first frame portion against the second frame portion in a zero gravity environment so as to form an acoustic data transmission conduit from the first frame portion to the second frame portion.

A3. The spacecraft of paragraph A2, wherein the forced coupling system comprises:
a lever arm coupled to one of the first frame portion and the second frame portion; and
a biasing member coupled to both the first frame portion and the second frame portion.

A4. The spacecraft of paragraph A3, wherein the lever arm and biasing member are spatially arranged so that a pivot joint of the joint is disposed on a first side of the lever arm and the biasing member is disposed on a second side of the lever arm, the first side being opposite the second side.

A5. The spacecraft of paragraph A3, wherein the lever arm and biasing member are spatially arranged so that a pivot joint of the joint and the biasing member are disposed on a common side of the lever arm.

A6. The spacecraft of paragraph A3, wherein the lever arm and biasing member are spatially arranged so that the lever arm is disposed on a first side of a pivot joint of the joint and the biasing member is disposed on a second side of the pivot joint of the joint, the first side being opposite the second side.

A7. The spacecraft of paragraph A1, wherein the joint comprises:
a hinge pin;
a first hinge leaf including a first knuckle portion, the first knuckle portion pivotally coupling the first hinge leaf to the hinge pin; and
a second hinge leaf including a second knuckle portion, the second knuckle portion pivotally coupling the second hinge leaf to the hinge pin.

A8. The spacecraft of paragraph A1, wherein the joint comprises:
a first joint portion having a longitudinal axis;
a second joint portion configured to move axially along the longitudinal axis of the first joint portion so as to form a telescoping joint; and
a biasing member disposed between the first joint portion and the second joint portion.

A9. The spacecraft of paragraph A1, wherein the acoustic communication system comprises:
a first data module;
a first acoustic transducer in communication with the first data module, the first acoustic transducer being coupled to the first frame portion;
a second data module; and
a second acoustic transducer in communication with the second data module, the second acoustic transducer being coupled to the second frame portion.

A10. The spacecraft of paragraph A9, wherein the first data module comprises one or more of a data source and a data receiver.

A11. The spacecraft of paragraph A9, wherein the second data module comprises one or more of a data source and a data receiver.

A12. The spacecraft of paragraph A9, wherein the first acoustic transducer comprises one or more of a transmitter and a receiver.

A13. The spacecraft of paragraph A9 wherein the second acoustic transducer comprises one or more of a transmitter and a receiver.

A14. The spacecraft of paragraph A9, further comprising one or more of a modulator and a demodulator communicably disposed between the first data module and the first acoustic transducer.

A15. The spacecraft of paragraph A9, further comprising one or more of a modulator and a demodulator communicably disposed between the second data module and the second acoustic transducer.

A16. The spacecraft of paragraph A9, wherein the acoustic communication system further comprises a media access control module coupled to at least the first acoustic transducer and the second acoustic transducer.

A17. The spacecraft of paragraph A16, wherein the media access control module is configured to multiplex acoustic signals between at least the first acoustic transducer and the second acoustic transducer.

A18. The spacecraft of paragraph A16, wherein the media access control module is configured to separate different acoustic data signals by polarizing the different acoustic data signals.

A19. The spacecraft of paragraph A16, wherein the media access control module is configured to separate different acoustic data signals by assigning the different acoustic data signals to a respective predetermined acoustic signal type.

A20. The spacecraft of paragraph A1, wherein the acoustic communication system is configured to transfer acoustic data signals, across the joint between the first frame portion and the second frame portion, in the form of longitudinal waves.

A21. The spacecraft of paragraph A1, wherein the acoustic communication system is configured to transfer acoustic data signals, across the joint between the first frame portion and the second frame portion, in the form of shear waves.

A22. The spacecraft of paragraph A21, wherein the shear waves are circularly polarized.

A23. The spacecraft of paragraph A21, wherein the shear waves are linearly polarized.

A24. The spacecraft of paragraph A1, Wherein the acoustic communication system is configured to transfer acoustic data signals, across the joint between the first frame portion and the second frame portion, in the form of torsional waves.

A25. The spacecraft of paragraph A1, wherein the acoustic communication system is configured to transfer acoustic data signals, across the joint between the first frame portion and the second frame portion, in the form of Rayleigh waves.

A26. The spacecraft of paragraph A1, wherein the acoustic communication system is configured to transfer acoustic data signals, across the joint between the first frame portion and the second frame portion, in the form of lamb waves.

A27. The spacecraft of paragraph A26, wherein the lamb waves are extensional mode lamb waves.

A28. The spacecraft of paragraph A26, wherein the lamb waves are flexural mode lamb waves.

A29. The spacecraft of paragraph A1, wherein the acoustic communication system is configured to transfer acoustic data signals, across the joint between the first frame portion and the second frame portion, in the form of love waves.

A30. The spacecraft of paragraph A1, Wherein the acoustic communication system is configured to transfer acoustic data signals, across the joint between the first frame portion and the second frame portion, in the form of Scholte waves.

B1. A spacecraft comprising:
a first frame portion;
a second frame portion;
a joint coupling the first frame portion to the second frame portion so as to form an acoustic data transmission conduit between the first frame portion and the second frame portion, the joint being configured to form the acoustic data transmission conduit in a zero gravity environment; and
an acoustic communication system configured to transfer acoustic data signals across the joint between the first frame portion and the second frame portion.

B2. The spacecraft of paragraph B1, wherein the joint includes a forced coupling system configured to bias the first frame portion against the second frame portion in the zero gravity environment so as to form the acoustic data transmission conduit from the first frame portion to the second frame portion.

B3. The spacecraft of paragraph B2, wherein the forced coupling system comprises:
a lever arm coupled to one of the first frame portion and the second frame portion; and
a biasing member coupled to both the first frame portion and the second frame portion.

B4. The spacecraft of paragraph B3, wherein the lever arm and biasing member are spatially arranged so that a pivot joint of the joint is disposed on a first side of the lever arm and the biasing member is disposed on a second side of the lever arm, the first side being opposite the second side.

B5. The spacecraft of paragraph B3, wherein the lever arm and biasing member are spatially arranged so that a pivot joint of the joint and the biasing member are disposed on a common side of the lever arm.

B6. The spacecraft of paragraph B3, wherein the lever arm and biasing member are spatially arranged so that the lever arm is disposed on a first side of a pivot joint of the joint and the biasing member is disposed on a second side of the pivot joint of the joint, the first side being opposite the second side.

B7. The spacecraft of paragraph B1, wherein the joint comprises:
a hinge pin;
a first hinge leaf including a first knuckle portion, the first knuckle portion pivotally coupling the first hinge leaf to the hinge pin; and
a second hinge leaf including a second knuckle portion, the second knuckle portion pivotally coupling the second hinge leaf to the hinge pin.

B8. The spacecraft of paragraph B1, wherein the joint comprises:
a first joint portion having a longitudinal axis;
a second joint portion configured to move axially along the longitudinal axis of the first joint portion so as to form a telescoping joint; and
a biasing member disposed between the first joint point and the second joint portion.

B9. The spacecraft of paragraph B1, wherein the acoustic communication system comprises:
a first data module;
a first acoustic transducer in communication with the first data module, the first acoustic transducer being coupled to the first frame portion;
a second data module; and
a second acoustic transducer in communication with the second data module, the second acoustic transducer being coupled to the second frame portion.

B10. The spacecraft of paragraph B9, wherein the first data module comprises one or more of a data source and a data receiver.

B11. The spacecraft of paragraph B9, wherein the second data module comprises one or more of a data source and a data receiver.

B12. The spacecraft of paragraph B9, wherein the first acoustic transducer comprises one or more of a transmitter and a receiver.

B13. The spacecraft of paragraph B9, wherein the second acoustic transducer comprises one or more of a transmitter and a receiver.

B14. The spacecraft of paragraph B9, further comprising one or more of a modulator and a demodulator communicably disposed between the first data module and the first acoustic transducer.

B15. The spacecraft of paragraph B9, further comprising one or more of a modulator and a demodulator communicably disposed between the second data module and the second acoustic transducer.

B16. The spacecraft of paragraph B9, wherein the acoustic communication system further comprises a media access control module coupled to at least the first acoustic transducer and the second acoustic transducer.

B17. The spacecraft of paragraph B16, wherein the media access control module is configured to multiplex acoustic data signals between at least the first acoustic transducer and the second acoustic transducer.

B18. The spacecraft of paragraph B16, wherein the media access control module is configured to separate different acoustic data signals by polarizing the different acoustic data signals.

B19. The spacecraft of paragraph B16, wherein the media access control module is configured to separate different acoustic data signals by assigning the different acoustic data signals to a respective predetermined acoustic signal type.

B20. The spacecraft of paragraph B1, wherein the acoustic communication system is configured to transfer acoustic data signals, across the joint between the first frame portion and the second frame portion, in the form of longitudinal waves.

B21. The spacecraft of paragraph B1, wherein the acoustic communication system is configured to transfer acoustic data signals, across the joint between the first frame portion and the second frame portion, in the form of shear waves.

B22. The spacecraft of paragraph B21, wherein the shear waves are circularly polarized.

B23. The spacecraft of paragraph B21, wherein the shear waves are linearly polarized.

B24. The spacecraft of paragraph B1, wherein the acoustic communication system is configured to transfer acoustic data signals, across the joint between the first frame portion and the second frame portion, in the form of torsional waves.

B25. The spacecraft of paragraph B1, wherein the acoustic communication system is configured to transfer acoustic data signals, across the joint between the first frame portion and the second frame portion, in the form of Rayleigh waves.

B26. The spacecraft of paragraph B1, wherein the acoustic communication system is configured to transfer acoustic data signals, across the joint between the first frame portion and the second frame portion, in the form of lamb waves.

B27. The spacecraft of paragraph B26, wherein the lamb waves are extensional mode lamb waves.

B28. The spacecraft of paragraph B26, wherein the lamb waves are flexural mode lamb waves.

B29. The spacecraft of paragraph B1, wherein the acoustic communication system is configured to transfer acoustic data signals, across the joint between the first frame portion and the second frame portion, in the forgo of love waves.

B30. The spacecraft of paragraph B1, wherein the acoustic communication system is configured to transfer acoustic data signals, across the joint between the first frame portion and the second frame portion, in the form of Scholte waves.

C1. A method for acoustic data transmission in a zero gravity environment, the method comprising:

forming an acoustic data transmission conduit with a joint, a first frame portion and a second frame portion where the joint movably couples the first frame portion and the second frame portion so that the first frame portion and the second frame portion are biased, in the zero gravity environment, in acoustic coupling contact; and transmitting acoustic data signals from the first frame portion to the second frame portion through the joint.

C2. The method of paragraph C1, wherein transmitting the acoustic data signals comprises transmitting the acoustic data signals between a first acoustic transducer coupled to the first frame portion and a second acoustic transducer coupled to the second frame portion.

C3. The method of paragraph C1, further comprising multiplexing the acoustic data signals with a media access control module.

C4. The method of paragraph C3, further comprising separating different acoustic data signals, with the media access control module, by polarizing the different acoustic data signals.

C5. The method of paragraph C3, further comprising separating different acoustic data signals, with the media access control module, by assigning the different acoustic data signals to a respective predetermined acoustic signal type.

C6. The method of paragraph C1, wherein the acoustic data signals are transmitted in the form of longitudinal waves.

C7. The method of paragraph C1, wherein the acoustic data signals are transmitted in the form of shear waves.

C8. The method of paragraph C7, wherein the shear waves are circularly polarized.

C9. The method of paragraph C7, wherein the shear waves are linearly polarized.

C10. The method of paragraph C1, wherein the acoustic data signals are transmitted in the form of torsional waves.

C11. The method of paragraph C1, wherein the acoustic data signals are transmitted in the form of Rayleigh waves.

C12. The method of paragraph C1, wherein the acoustic data signals are transmitted in the form of lamb waves.

C13. The method of paragraph C12, wherein the lamb waves are extensional mode lamb waves.

C14. The method of paragraph C12, wherein the lamb waves are flexural mode lamb waves.

C15. The method of paragraph C1, wherein the acoustic data signals are transmitted in the form of love waves.

C16. The method of paragraph C1, wherein the acoustic data signals are transmitted in the form of Scholte waves.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 6, referred to above, the blocks may represent operations and/or portions thereof and lines connecting the various blocks do not imply any particular order or dependency of the operations or portions thereof. Blocks represented by dashed lines indicate alternative operations and/ex portions thereof. Dashed lines, if any, connecting the various blocks represent alternative dependencies of the operations or portions thereof. It will be understood that not all dependencies among the various disclosed operations are necessarily represented. FIG. 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/ex processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A spacecraft comprising:
    a frame including a joint coupling a first frame portion to a second frame portion, wherein the joint is configured to provide relative movement between the first frame portion and the second frame portion; and
    an acoustic communication system configured to transfer acoustic data signals across the joint between the first frame portion and the second frame portion;
    wherein the joint includes a forced coupling system configured to bias the first frame portion against the second frame portion in a zero gravity environment so as to form an acoustic data transmission conduit from the first frame portion to the second frame portion.

2. The spacecraft of claim 1, wherein the forced coupling system comprises:
    a lever arm coupled to one of the first frame portion and the second frame portion; and
    a biasing member coupled to both the first frame portion and the second frame portion.

3. The spacecraft of claim 1, wherein the joint comprises:
    a hinge pin;
    a first hinge leaf including a first knuckle portion, the first knuckle portion pivotally coupling the first hinge leaf to the hinge pin; and
    a second hinge leaf including a second knuckle portion, the second knuckle portion pivotally coupling the second hinge leaf to the hinge pin.

4. The spacecraft of claim 1, wherein the joint comprises:
    a first joint portion having a longitudinal axis;
    a second joint portion configured to move axially along the longitudinal axis of the first joint portion so as to form a telescoping joint; and
    a biasing member disposed between the first joint portion and the second joint portion.

5. The spacecraft of claim 1, wherein the acoustic communication system comprises:
    a first data module;
    a first acoustic transducer in communication with the first data module, the first acoustic transducer being coupled to the first frame portion;
    a second data module; and
    a second acoustic transducer in communication with the second data module, the second acoustic transducer being coupled to the second frame portion.

6. The spacecraft of claim 5, further comprising one or more of a modulator and a demodulator communicably disposed between the first data module and the first acoustic transducer.

7. The spacecraft of claim 5, further comprising one or more of a modulator and a demodulator communicably disposed between the second data module and the second acoustic transducer.

8. The spacecraft of claim 5, wherein the acoustic communication system further comprises a media access control module coupled to at least the first acoustic transducer and the second acoustic transducer.

9. The spacecraft of claim 8, wherein the media access control module is configured to multiplex acoustic signals between at least the first acoustic transducer and the second acoustic transducer.

10. The spacecraft of claim 8, wherein the media access control module is configured to separate different acoustic data signals by polarizing the different acoustic data signals.

11. The spacecraft of claim 8, wherein the media access control module is configured to separate different acoustic data signals by assigning the different acoustic data signals to a respective predetermined acoustic signal type.

12. A spacecraft comprising:
    a first frame portion;
    a second frame portion;
    a joint coupling the first frame portion to the second frame portion so as to form an acoustic data transmission conduit between the first frame portion and the second frame portion, the joint being configured to form the acoustic data transmission conduit in a zero gravity environment and to provide relative movement between the first frame portion and the second frame portion; and
    an acoustic communication system configured to transfer acoustic data signals across the joint between the first frame portion and the second frame portion;
    wherein the joint includes a forced coupling system configured to bias the first frame portion against the second frame portion in the zero gravity environment so as to form the acoustic data transmission conduit from the first frame portion to the second frame portion.

13. The spacecraft of claim 11, wherein the forced coupling system comprises:
    a lever arm coupled to one of the first frame portion and the second frame portion; and
    a biasing member coupled to both the first frame portion and the second frame portion.

14. The spacecraft of claim 12, wherein the joint comprises:
    a hinge pin;
    a first hinge leaf including a first knuckle portion, the first knuckle portion pivotally coupling the first hinge leaf to the hinge pin; and
    a second hinge leaf including a second knuckle portion, the second knuckle portion pivotally coupling the second hinge leaf to the hinge pin.

15. The spacecraft of claim 12, wherein the joint comprises:
    a first joint portion having a longitudinal axis;
    a second joint portion configured to move axially along the longitudinal axis of the first joint portion so as to form a telescoping joint; and
    a biasing member disposed between the first joint portion and the second joint portion.

16. A method for acoustic data transmission in a zero gravity environment, the method comprising:
    forming an acoustic data transmission conduit with a joint, a first frame portion and a second frame portion where the joint movably couples the first frame portion and the second frame portion so that the first frame portion and the second frame portion are biased, in the zero gravity environment, in acoustic coupling contact; and
    transmitting acoustic data signals from the first frame portion to the second frame portion through the joint;
    wherein the joint includes a forced coupling system configured to bias the first frame portion against the second frame portion in the zero gravity environment so as to form the acoustic data transmission conduit from the first frame portion to the second frame portion.

17. The method of claim 16, wherein transmitting the acoustic data signals comprises transmitting the acoustic data signals between a first acoustic transducer coupled to the first frame portion and a second acoustic transducer coupled to the second frame portion.

18. The method of claim 16, further comprising multiplexing the acoustic data signals with a media access control module.

19. The method of claim 18, further comprising separating different acoustic data signals, with the media access control module, by polarizing the different acoustic data signals.

20. The method of claim 18, further comprising separating different acoustic data signals, with the media access control module, by assigning the different acoustic data signals to a respective predetermined acoustic signal type.

* * * * *